United States Patent [19]

Counter et al.

[11] Patent Number: 4,643,291
[45] Date of Patent: Feb. 17, 1987

[54] LINEAR ARTICULATED PUSHER

[75] Inventors: Louis F. Counter, Greendale; Fritz A. Callies, Menomonee Falls; Phillip L. Lee, Milwaukee, all of Wis.

[73] Assignee: Rexnord Inc., Brookfield, Wis.

[21] Appl. No.: 820,855

[22] Filed: Jan. 21, 1986

[51] Int. Cl.4 .............................. B65G 47/46
[52] U.S. Cl. .................... 198/356; 198/367; 198/372; 198/598
[58] Field of Search ........... 198/356, 367, 372, 468.01, 198/598

[56] References Cited

U.S. PATENT DOCUMENTS

| | | |
|---|---|---|
| 974,476 | 11/1910 | Dauner et al. . |
| 1,881,895 | 10/1932 | Olson . |
| 3,026,988 | 3/1962 | Fisk . |
| 3,045,801 | 7/1962 | Graybeal . |
| 3,083,808 | 4/1963 | Graybeal . |
| 3,198,308 | 8/1965 | Driesch et al. . |
| 3,221,424 | 12/1965 | Hancock ............................ 37/129 |
| 3,484,655 | 12/1969 | Peltier ............................ 198/356 X |
| 3,568,814 | 3/1971 | Gates et al. . |
| 3,599,789 | 8/1971 | Kurczak ......................... 198/367 X |
| 3,724,684 | 4/1973 | Butler et al. . |
| 4,256,216 | 3/1981 | Winters et al. ...................... 198/488 |
| 4,295,559 | 10/1981 | Neal et al. ............. 198/598 |
| 4,298,117 | 11/1981 | Kobayashi et al. ................. 198/367 |
| 4,441,604 | 4/1984 | Schlig et al. ......................... 198/598 |

FOREIGN PATENT DOCUMENTS 58-36820  3/1983  Japan .
441017  12/1974  U.S.S.R. .............................. 198/488

Primary Examiner—Jeffrey V. Nase
Attorney, Agent, or Firm—William L. Falk

[57] ABSTRACT

A pusher mechanism supported on a framework for deflecting objects from a conveyor has a retractable pusher which is mounted for linear movement transversely across the conveyor. A paddle is pivotably attached at its midportion to an outer end of the pusher. A movable link is secured between the framework and an end of the paddle. Due to these paddle connections, controlled linear movement of the pusher will cause the paddle to articulate on the pusher from a rest position to an operating position at which an object is deflected from the conveyor and back to the rest position.

13 Claims, 9 Drawing Figures

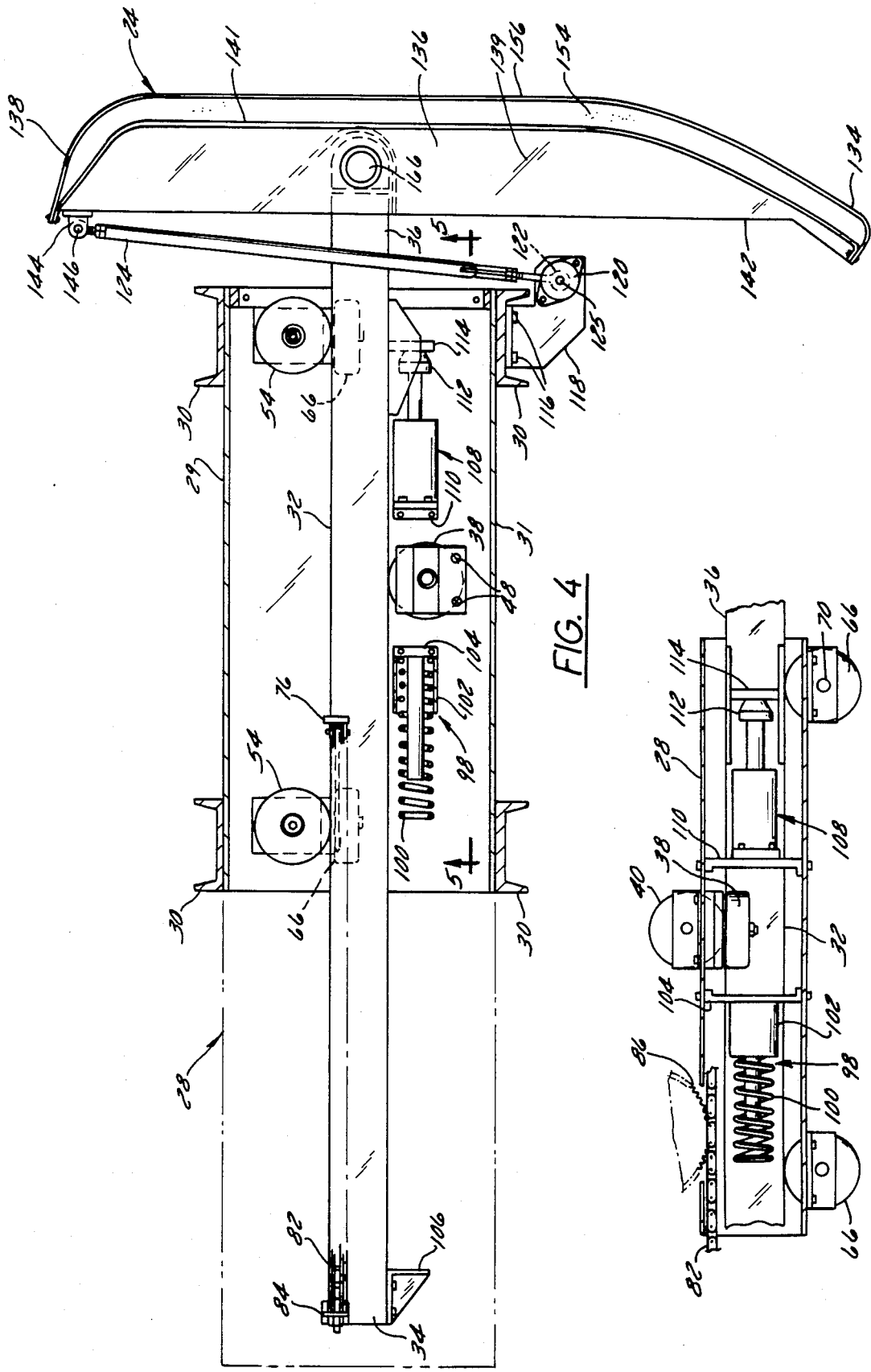

LINEAR ARTICULATED PUSHER

BACKGROUND OF THE INVENTION

This invention relates to improvements in material handling apparatus and, more particularly, to a mechanism for pushing and diverting objects from conveyors.

It is well known in the prior art of material handling to employ conveyors with moving belts or the like for transporting objects of various sizes and shapes along a path. It is also common practice to utilize diverters along the path for transferring, sorting or distributing the objects at certain points to other locations such as auxiliary conveyors, spurs or outflow chutes. Such arrangements have particular utility in warehouses, factories, truck terminals, shipping rooms, mail bag and courier distribution, and airline baggage systems. In these applications, the diverters may individually, or in combination, push an object at some angle across a conveyor belt, block an object at some angle to the belt so that the belt motion causes the object to slide across the belt, or arrest the motion of and snatch the object from the belt. Additionally, the diverters may employ linear, translatory, or rotary movement of one or more object engaging devices which move through forward and return cycles to unload or remove objects from the belt.

For example, U.S. Pat. No. 3,198,308 to Driesch, et. al., discloses a linear pusher having a paddle fixed at the end of a reciprocating piston rod and parallel to the conveyor belt. Driesch, et. al., also discloses a snatcher having a paddle pivotably attached at one end to a framework and at its end portion to the end of a reciprocating piston rod. U.S. Pat. No. 3,026,988 to Fisk and 4,295,559 to Neal, et. al., are illustrative of air-actuated translatory linkages used to move together with an article along the conveyor while simultaneously shifting the article transversely of the conveyor. U.S. Pat. Nos. 3,083,808 to Graybeal and 4,441,604 to Schlig, et. al., disclose rotary pushers wherein dual paddles are revolved in a rotary motion to engage objects such that the face of each paddle will always remain parallel to the direction of belt travel. Various attempts have been made by each of these patents to upgrade sorting or orienting capability of objects at high speeds by provision of different paddle linkages and their associated drives along with the ensuing geometric motion produced thereby. However, there remains a need in this well-developed art for a diverting pusher which is capable of accomplishing transfer of objects at high rates by controlling the motion and speed of the paddle on a push phase of a cycle for gentle object handling, and then performing the remainder of the cycle rapidly to maximize cycle rate and reduce the spacing between conveyed objects. For instance, when utilizing some prior art devices, some paddles may dwell too long at the end of their forward stroke or operate with time delays which can create jams and missorts. In other cases, the moving mass of the paddle may be at maximum velocity at time of impact with the object with resultant damage or destruction to the objects. These are particularly sensitive drawbacks when diverters or pushers are used in the handling of airline baggage which may vary tremendously in size, shape and fragility.

Accordingly, it is a principal object of the invention to provide an improved pushing and diverting mechanism for unloading a wide variety of objects from a conveyor at a high rate of speed with accuracy and control.

Another object of the invention is to furnish a sorting device which combines linear and articulated movements to deflect objects from a conveyor.

It is a further object of the invention to provide a diverting pusher which will allow for a more gentle removal of objects from a conveyor.

A still further object of the invention is to provide a diverting pusher exhibiting a controlled push cycle to minimize damage to objects being conveyed and an assisted return cycle to reduce spacing between objects being conveyed.

One of the salient features of our invention is the combination of a linear pushing and paddle articulation movement for deflecting objects from a conveyor.

An attendant feature of our invention is a controlled drive arrangement which will decelerate the paddle prior to the termination of the push cycle and accelerate paddle return thereafter.

A further feature of our invention resides in cushioning elements of the diverting pusher.

Another feature of our invention is found in the light weight but rigid construction of the diverting pusher elements which provide the desired high rate of speed with needed stability to resist intermittent impact forces on objects being conveyed.

SUMMARY OF THE INVENTION

The present invention is directed to an improved diverting pusher used with conveyors for deflecting objects such as airline baggage or the like which attempts to solve the drawbacks of prior diverters.

In a preferred embodiment, the present invention contemplates a diverting mechanism which is mounted on a support framework adjacent a moving conveyor surface and includes a pusher which is mounted for pushing and retracting cycles transversely across the conveyor surface. A paddle is pivotably attached at its midportion to an outer end of the pusher lying adjacent the conveyor surface. A moveable link is connected at one end to the framework and at its other end to an end of the paddle. The pusher is moved in a straight line transversely across the conveyor surface, and due to the paddle linkage, causes the paddle to articulate from a rest position to an operating position at which an object is deflected from the conveyor surface and then back to the rest position.

A drive provides a deceleration to the pusher paddle, and object being deflected as the pushing cycle ends. The drive further is assisted by a spring which stores energy during the push cycle to accelerate return of the pusher at a rate greater than the rate of the pushing cycle. Cushioning is provided for the accelerated return of the pusher and paddle by a shock absorber and shock mounts.

The various features of novelty which characterize this invention are pointed out particularly in the claims annexed to and forming a part of this specification. For a better understanding of the invention, its operating advantages and specific objects obtained by its use, reference should be had to the accompanying drawings and descriptive matter in which there is illustrated and described a preferred embodiment of the invention.

BRIEF DESCRIPTION OF THE DRAWINGS

The invention and its attendant objects and advantages will become better understood by reference to the following detailed description of the preferred embodiment when read in conjunction with the following drawings wherein:

FIG. 4 is a sectional view of the diverting pusher mechanism taken generally along line 4—4 of FIG. 3;

FIG. 5 is a fragmentary, sectional view of a portion of the diverting pusher mechanism taken along line 5—5 of FIG. 4;

DETAILED DESCRIPTION OF THE PREFERRED EMBODIMENT

Figure 2:
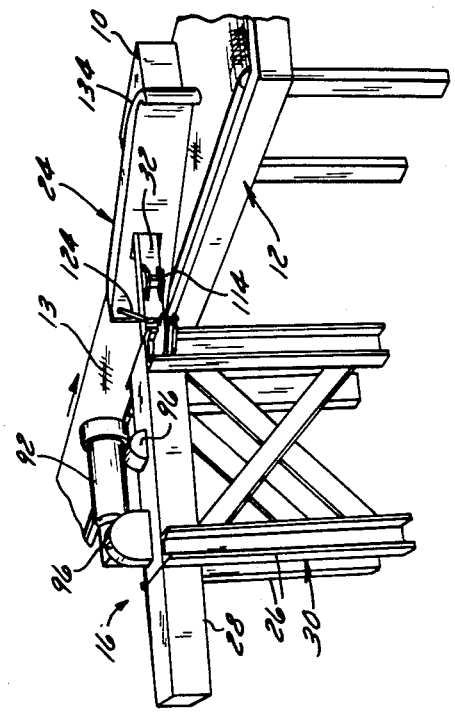
FIG. 2 is a perspective view of a diverting pusher mechanism of the present invention.
Figure 1:
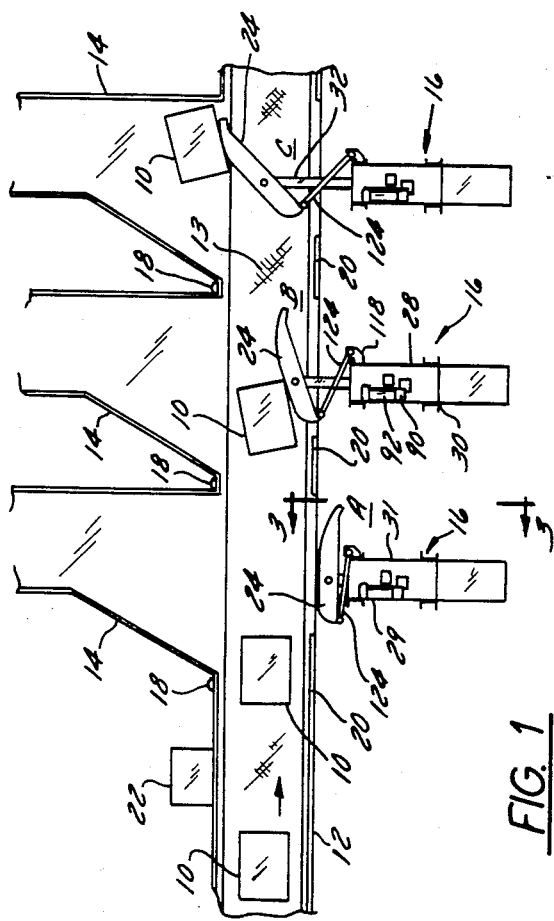
FIG. 1 is a top plan view of a section of a conveyor showing a preferred form of the present invention.
Figure 3:
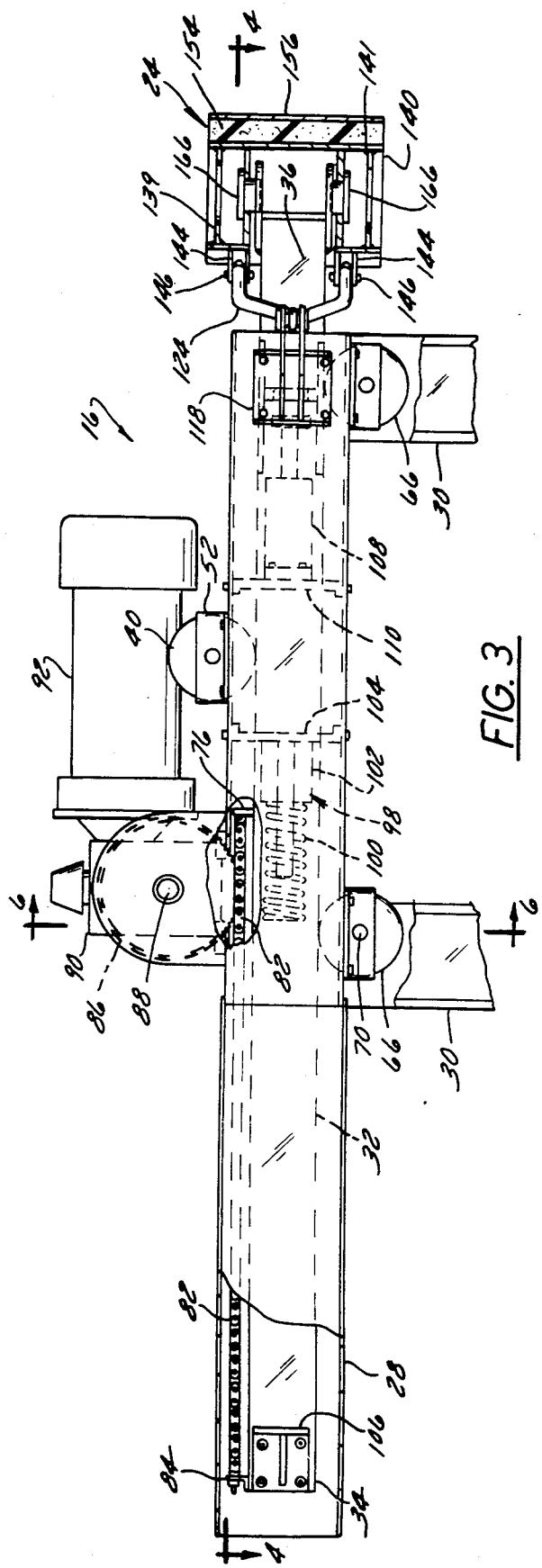
FIG. 3 is an enlarged, fragmentary, side view of the diverting pusher mechanism taken along line 3—3 of FIG. 1.

FIG. 1 illustrates objects 10 moving along a conveyor 12 in the direction shown by the arrow and transferred onto any one of a series of spurs, chutes or outflow conveyors 14. In the preferred embodiment, the conveyor 12 has an endless belt 13 for carrying objects 10, in the form of airline baggage, mail bags, cartons or the like, past several of these spurs or chutes 14. Transfer of objects 10 to the spurs or chutes 14 results from selective actuation of any of several diverting pusher mechanisms 16 mounted adjacent the conveyor 12. Photocells 18 secured on one side of the conveyor 12 each emit a light beam at a reflector 20 on the other side of the conveyor 12 and cooperate with a microprocessor 22 to enable the diverting pusher mechanism 16 to be operated upon interruption of the light beam by a conveyed object.

For the purpose of providing efficient and accurate transfer or distribution of the objects 10 being conveyed, each diverting mechanism 16 has a paddle 24 which is normally held in a retracted, or rest position A, at one side of the conveyor 12. To transfer an object 10 into a spur or chute 14, the paddle 24 is powered to articulate transversely across the conveyor 12, as shown in positions B and C, to deflect an object 10 and then return to its rest position in a unique manner to be fully described.

Figure 6:
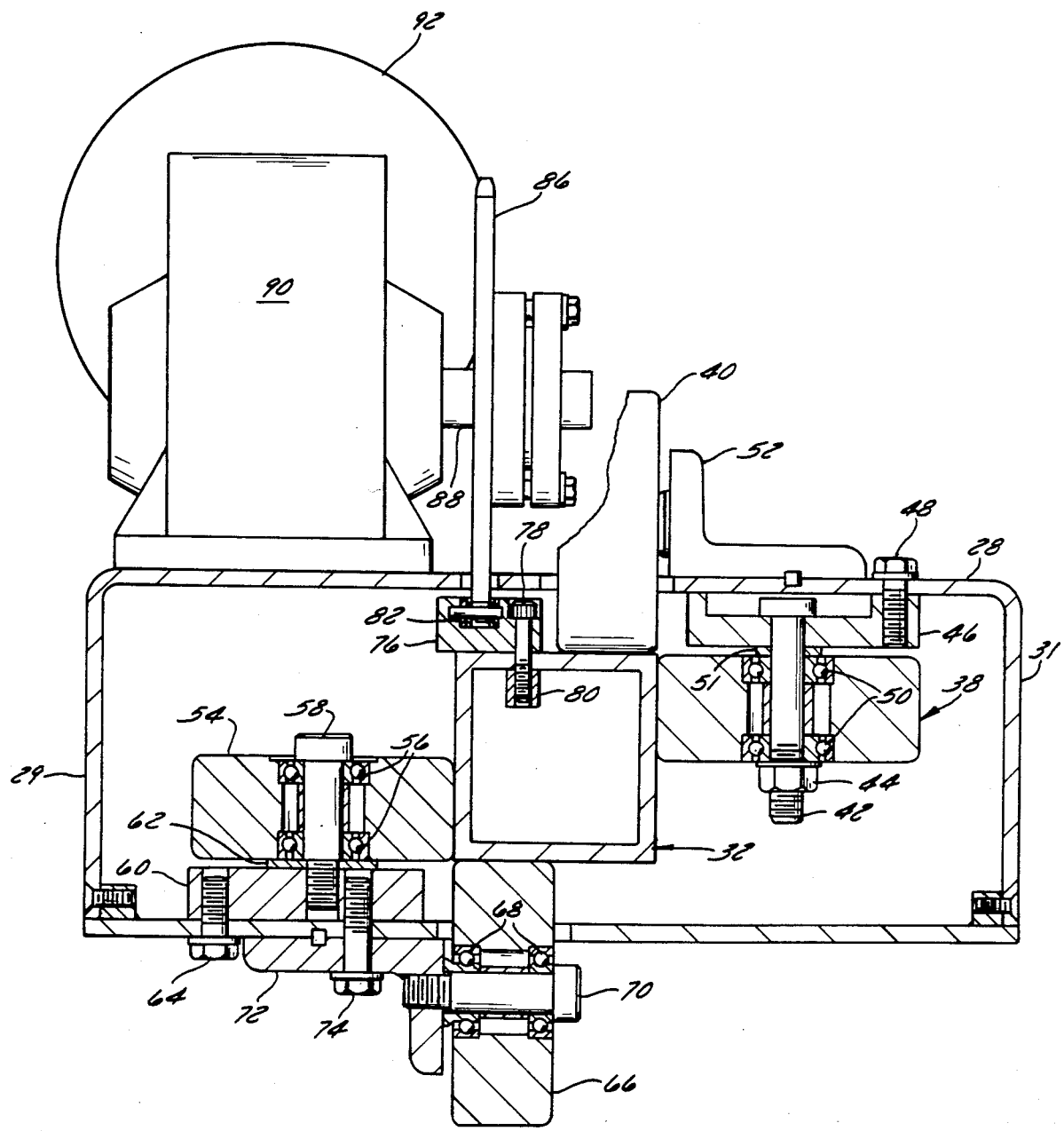
FIG. 6 is an enlarged sectional view of the diverting pusher mechanism taken along line 6—6 of FIG. 3.

Referring now to FIGS. 2 thru 5, the diverting mechanism 16 is positioned adjacent the conveyor 12 which is supported above the floor by legs 26 and includes a generally rectangular housing 28 mounted on top of a support framework 30 anchored to the floor. The housing 28 has a leading edge 29 closest to the objects being conveyed and a trailing edge 31 furthest from the objects being conveyed. Mounted inside the housing 28 is a retractable pusher 32 in the form of a elongated, square, aluminum beam which is linearly movable into and out of the housing 28 for movement directly across the conveyor 12. The pusher 32 has an inner end 34 and an outer or free end 36 and is guided on all sides along a linear path by three horizontal guide wheels 38, 54 inside the housing 28 and three vertical guide wheels 40, 66 projecting from the top and bottom of the housing 28. As seen best in FIG. 6, the horizontal guide wheels 38 on one side of the housing 28, relative to the axial centerline of the pusher 32, engage an upper side of the pusher 32 and are suspended by a bolt 42 and nut 44 from a horizontal wheel support 46 fixed to the underside of the top of the housing 28 by fasteners 48. Each wheel 38 is provided with spaced bearings 50 at its upper and lower ends to allow rotation of the wheel 38 about the bolt 42. The vertical guide wheel 40 projects from the top of the housing 28, engages the top side of the pusher 32 and is rotatably mounted to a vertical wheel bracket 52 fixed to the top of the housing 28. In similar fashion, the horizontal guide wheel 54 on the other side of the housing 28 contacts a lower side of the pusher 32 and is mounted for rotation by bearings 56 about a bolt 58 which is tapped into a horizontal wheel support 60. The support 60 is separated from the wheel 54 by a spacer 62 and is fixed along the inside bottom of the housing 28 by fasteners 64. The vertical wheel 66 juts from the bottom of the housing 28, runs against the bottom side of the pusher 32 and is rotatable by bearings 68 about a bolt 70 tapped into a vertical wheel bracket 72 fixed to the housing 28 by fastener 74. The guide wheels 38, 40 are shown located in fixed positions with respect to the housing 28 but may incorporate any desired adjustment device to refine the frictional contact of each wheel with the appropriate pusher surface. By provision of these guide wheels 38, 40, 54, 66, the pusher 32 is thus positively guided in a straight line of travel and is protected from any major torsional deflection.

In order to move the pusher 32 in and out of the housing 28, the diverting pusher mechanism 16 is furnished with a rack and pinion drive arrangement. As shown in FIGS. 3 through 6, a chain keeper 76 is secured to the top of the pusher 32 centrally of its axial length by means of a bolt 78 which passes through the top of the pusher 32 and a lock bar 80 which is fastened on the end of the bolt 78. The chain keeper 76 retains one end of a chain 82 which extends axially along the top of the pusher 32 towards the inner end 34 of the pusher where the chain 82 terminates in a tensioner 84. The chain 82 is engageable throughout its length with a sprocket wheel 86 which is rotatably mounted on the output shaft 88 of a right angle, worm gear reducer 90. The reducer 90, in turn, is selectively driven by a reversible DC motor 92 having adjustable speed and regenerative control for providing acceleration and deceleration in both forward and reverse directions. The sprocket wheel 86, gear reducer 90, and motor 92 are all mounted on top of the housing 28, and along with the vertical wheels 40, 66 are provided with covers or guards 96 to shield any mechanical or electrical components during operation.

Internal components of the diverting pusher mechanism 16 include an energy storing return assembly 98 located on one side of the housing, centrally of its axial length. The assembly comprises a coil rebound spring 100 mounted for compression and release against a bumper bar assembly 102 which is joined to a retainer plate 104 fastened to the top and bottom of the housing 28.

The spring 100 is engageable with a stop 106 fixed on the inner end and to one side of the pusher 32. An adjustable, dampening shock absorber 108 is fastened to a mounting plate 110 extending between the top and bottom of the housing 28 and includes a pad 112 biased outwardly. The pad 112 is engaged with a shoulder 114 provided on one side of the pusher 32 near its outer or free end 36 for providing momentary cushioning upon application of force during retraction of the pusher.

Figure 9:
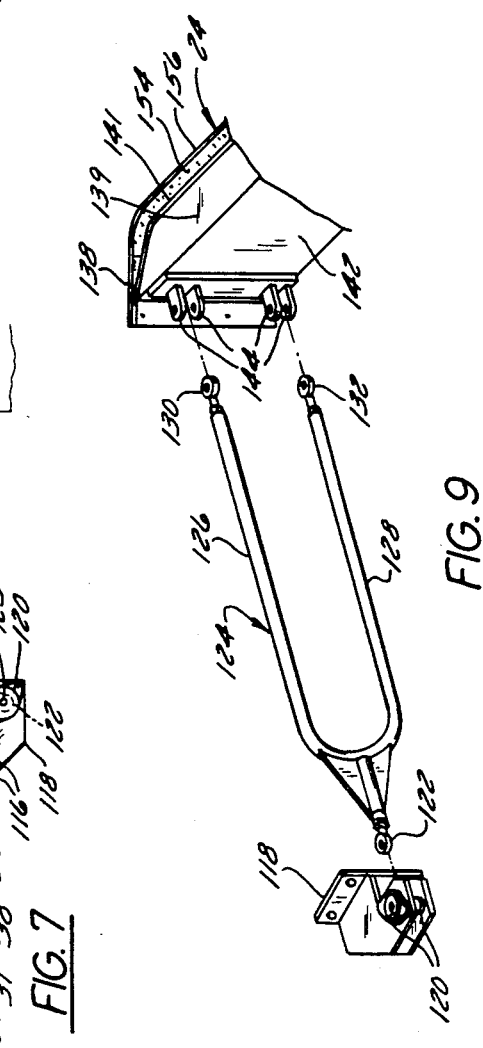
FIG. 9 is an exploded, perspective view of the yoke, and its connections to the framework and paddle of the present invention.

A distinctive feature of the present invention resides in the linkage of the framework 30, pusher 32 and paddle 24. Attached to the framework 30 by fasteners 116 at a corner of the housing 28 on its trailing edge 31 adjacent the conveyor 12 is a mounting bracket 118, shown in FIG. 7 and 9. The bracket 118 carries a set of shock mounts 120 between which a single rod end 122 of a generally U-shaped yoke or link 124 is swingably fastened by pin 125. The yoke 124 has two elongated arms 126, 128, each of which terminate in a rod end 130, 132 similar to rod end 122. The contoured paddle 24 is of lightweight metal, such as aluminum, and has a trailing end portion 134, furthest from objects being conveyed, a midportion 136 and a leading end portion 138 closest to objects being conveyed. The paddle 24 also has a top portion 139, a bottom portion 140, a front surface 141 and a rear surface 142 having, at its leading end, two pairs of horizontally spaced apart, parallel ears 144, with each rod end 130, 132 being pivotably secured between a respective set of ears 144 by retainers 146. The inside of the paddle 24 comprises a square tube framework 148, FIG. 8, connected to a pocket formed by horizontal plates 150 and a vertical plate 152, and the front surface 141 is preferably cushioned by an elastomeric foam 154, such as neoprene, which is, in turn, covered by a wear resistant, plastic material liner 156 such as nylon. Jaw plates 158 on the free end of the pusher 32 each carry inner race 160 and bearings 162 in a bearing cup 164 which is aligned with an aperture in each horizontal plate 150 through which a pivot shaft 166 passes and is threadably inserted into the bearing inner race 160 to provide an articulation or pivot point between the pusher 32 and paddle 24. Keepers 168 are employed to retain a preload for the bearings 162.

Figure 7:
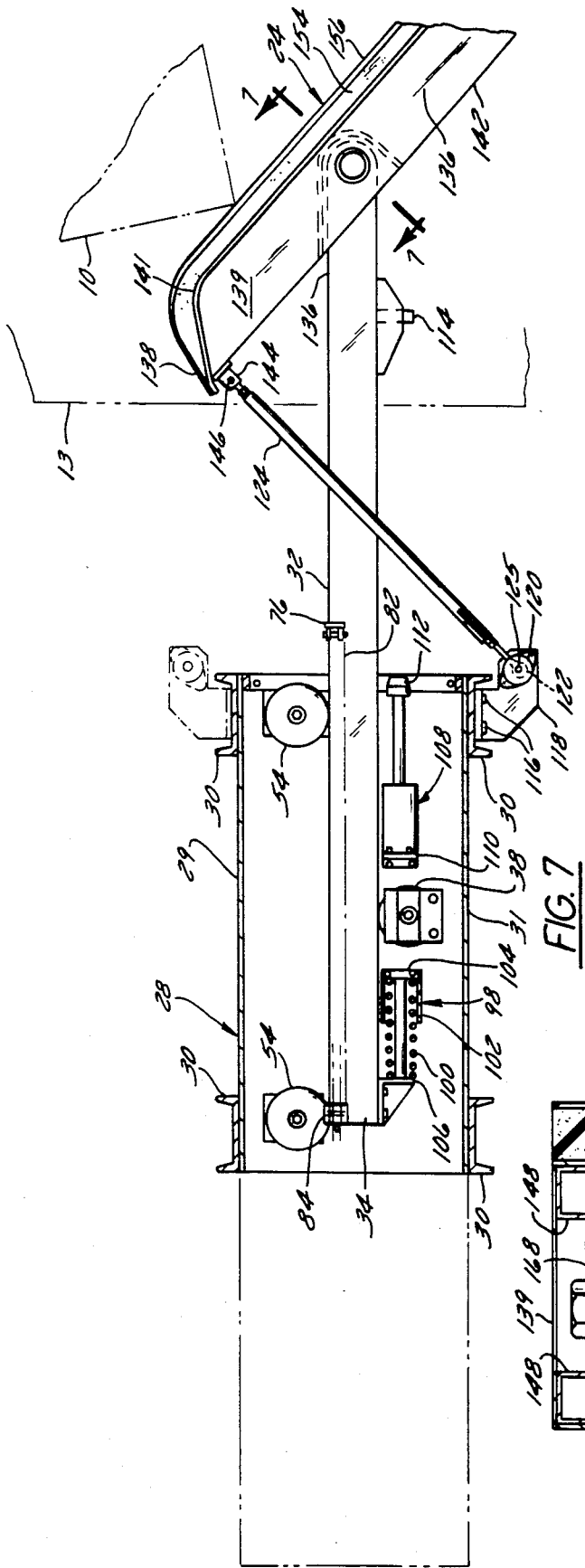
FIG. 7 is a view similar to FIG. 4 but showing the diverting pusher mechanism in an extended position.
Figure 8:
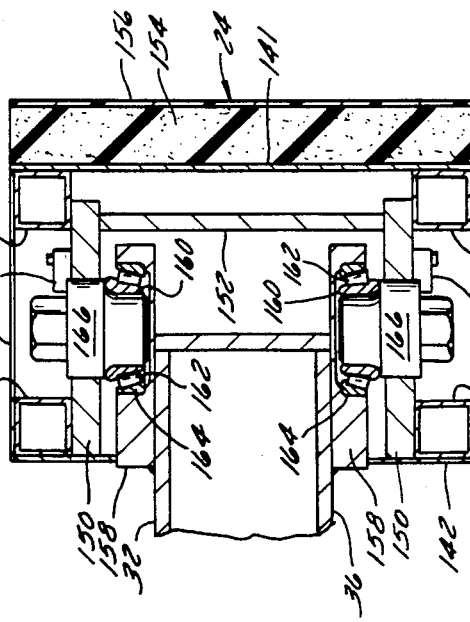
FIG. 8 is an enlarged, sectional view taken along line 7—7 of FIG. 7 showing the bearing connection between the paddle and pusher of the present invention.

The operation of the present invention is best understood with reference to FIGS. 1, 4 and 7, the latter two figures showing in more detail the paddle 24 and its associated components in a rest position and deflecting, or operating, position. In the rest position, the plastic surface 156 of the paddle 24 lies adjacent the conveyor 12 and the shoulder 114 on the pusher 32 lies against the pad 112. When it is desired to transfer objects 10 being conveyed to a spur or chute 14, photocells 18 detect the objects and cooperate with a microprocessor 22 or similar controller to activate the motor 92. Such actuation will cause rotation and engagement of the sprocket 86 along the chain 82 to move the pusher 32 along a linear path in a forward or push cycle across the conveyor 12. This linear motion, because of the movable link 124, will cause the paddle 24 to articulate on the pusher 32 to an operating position at which an object 10 contacts and slides smoothly across the cushioned, nylon-coated front surface of the paddle 24, and is deflected from the trailing end 134 to the desired spur or chute 14. During this push cycle, the motor 92 advances the pusher 32 initially at a low rate, accelerates this rate over the middle portion of the cycle and then, using regenerative braking, decelerates the push rate near the end in order to prevent launching articles off the conveyor 12. Power to the motor 92 near the end of the push cycle is reversed and the paddle 24 is returnable to its rest position. Also, during the push cycle, the pusher 32 compresses the rebound spring 100 to store energy for propelling the pusher 32 and paddle 24 back to the rest position, and this force combined with the reversing motor force enables an accelerated retract cycle of the pusher 32 which is substantially greater than the rate of the push cycle. Depending on the preferred rate of handling the objects being conveyed, the rate of return of the pusher 32 is typically in the range of 1.3 to 2 times the rate of the pusher during the push cycle. This accelerated retracting of the pusher 32 enables the spacing between objects being conveyed to be reduced. The mechanism protects this accelerated return cycle by providing shock mounts 120 at the connection of the link 124 to the framework 30 and the shock absorber 108 which dampen the return to provide smooth, controlled stopping action and retain positive, pusher positioning via the guide wheels 38, 40, 54, 66.

Thus, the present invention furnishes a diverting pusher mechanism 16, in the form of a linear articulated pusher, which utilizes a unique linkage combined with a controlled drive arrangement to provide smooth, gentle transfer or distribution of objects 10 from a conveyor 12. Provision of the articulated paddle 24 reduces the linear stroke of the pusher and correspondingly reduces the overall length of the device. The preferred form of the embodiment is capable of diverting widely varying objects, such as airline bags weighing as much as 75 pounds, at rates up to 75 bags per minute with conveyor belt speeds as high as 450 feet per minute with minimal damage, jamming and missorting of the bags.

Unlike prior art devices, the present invention reduces dwell time at the end of the pusher cycle by the use of a regeneratively controlled motor 92. In addition, the present invention does not deflect objects at maximum velocity of the pusher, as in the prior art, so as to minimize damage to and launching of objects. Furthermore, the present invention avoids the prior art expedient of pivoting the end of a paddle directly to a framework which restricts the mobility and handling capability of the paddle. Instead, the movable linkage of the present linear articulated pusher creates a geometric relationship between the pusher 32 and paddle 24 which markedly improves sorting and object transfer.

While the preferred embodiment shows the mounting bracket on one side of the framework 30, it should be appreciated that the bracket may easily be reversed on the other side of the framework, as seen in FIG. 7, to adapt a link 124 and paddle 24 for a pusher which will deflect objects traveling in an opposite direction. Also, it should be understood that various types of controls as known in the art may be used to monitor or refine the motion of the pusher or objects being conveyed.

What is claimed is:

1. In a diverting mechanism mounted on a framework adjacent a moving conveyor surface for deflection of objects therefrom, the combination comprising:
   a retractable pusher having an inner end and an outer end adjacent said conveyor surface, said pusher being mounted on said framework for movement transversely across said conveyor surface;
   a paddle having a leading end portion closest to objects conveyed along said conveyor surface and a trailing end portion, said paddle being pivotably attached between said leading and said trailing end portions to said outer end of said pusher;

a movable link pivotably connected to said framework and said leading end portion of said paddle; and means secured on said framework for providing retractable movement of said pusher transversely across but preventing movement longitudinally along said conveyor surface and causing said paddle to articulate on said retractable pusher from a rest position to an operating position at which an object is deflected from said conveyor surface and back to the rest position.

2. A diverting mechanism as defined in claim 1 wherein said pusher is an elongated tube carrying a chain rack.

3. A diverting mechanism as defined in claim 1 wherein said paddle is provided with a elastomeric foam and plastic contact surface for cushioning the force applied to objects being deflected.

4. A diverting mechanism as defined in claim 1 wherein said connections of said link to said framework includes shock mounts for minimizing vibration.

5. A diverting mechanism as defined in claim 1 wherein said means for providing retractable movement of said pusher includes a rack and pinion drive.

6. A diverting mechanism as defined in claim 2 wherein said means for providing retractable movement of said pusher comprises a reversible motor, a gear reducer operatively connected to said motor and a sprocket driven by said gear reducer and engageable with said chain rack on said pusher.

7. A linear articulated pusher supported upon a framework for deflecting objects moving along a moving conveyor surface comprising:

a retractable pusher constructed and arranged on said framework for linear movement transversely across said conveyor surface, said pusher having a free end adjacent said conveyor surface;

a paddle having a leading end closest to objects conveyed along said conveyor surface, a trailing end furthest from objects conveyed along said conveyor surface and a midportion between said leading and trailing ends, said paddle being pivotably attached at said midportion to said free end of said pusher;

a movable link pivotably connected at one end to said framework at a point opposite from said leading end and at its other end to said leading end of said paddle; and means secured on said framework for providing linear reversible, pushing and retracting cycles of said pusher transversely across said conveyor surface and causing articulation of said paddle on said pusher from a rest position to an operating position at which an object is deflected from said conveyor surface and back to a rest position, said means being able to decelerate said pusher before the end of said pushing cycle and provide acceleration for said retracting cycle.

8. A linear articulated pusher as defined in claim 7, said means for providing linear reversible, pushing and retracting cycles of said pusher also providing a deceleration of said pusher and said paddle prior to the termination of said pushing cycle.

9. A linear articulated pusher as defined in claim 7 wherein said means for providing linear, reversible pushing and retracting cycles of said pusher includes a regeneratively controlled DC motor for reducing dwell of the pusher at the end of its pushing cycle.

10. A linear articulated pusher as defined in claim 7, further including sensing means adjacent said conveyor surface for detecting position of objects being conveyed and controlling the movement of said pusher.

11. A linear articulated pusher for discharging objects travelling along a moving conveyor surface comprising;

a housing having a leading edge closest to objects being conveyed and a trailing edge furthest from objects being conveyed;

a retractable pusher, mounted for linear movement into and out of said housing and transversely across said conveyor surface, said pusher having a free end adjacent said conveyor surface;

a paddle having a leading end closest to objects being conveyed, a trailing end furthest from objects being conveyed, and a midportion pivotably attached to said free end of said pusher;

a moveable link pivotably connected at one end to said trailing edge of said housing and at its other end to the leading end of said paddle;

dampening means secured in said housing and engageable with said pusher to cushion movement of said pusher into said housing;

energy storage means fixed in said housing and engageable with said pusher to assist in movement of said pusher into said housing; and means secured on said housing for providing linear movement of said pusher into and out of said housing and perpendicularly across said conveyor surface and causing said paddle to articulate on said pusher from a rest position to an operating position at which an object is deflected from said conveyor surface and back to a rest position, said means for providing movement of said pusher into said housing cooperable with said energy storage means to define a rate of movement of said pusher into said housing which is greater than the rate of movement of said pusher out of said housing.

12. A linear articulated pusher as defined in claim 11 wherein said dampening means comprises an adjustable, shock absorber and said energy storage means comprises a compression spring.

13. A linear articulated pusher as defined in claim 11 wherein said housing includes guide means for guiding said pusher in a straight line and minimizing torsional deflection thereof.

* * * * *